(12) United States Patent
Duarte et al.

(10) Patent No.: US 9,356,174 B2
(45) Date of Patent: May 31, 2016

(54) ROOFING FLASHINGS AND ROOFING SYSTEMS AND PHOTOVOLTAIC ROOFING SYSTEMS USING THE SAME

(71) Applicant: CertainTeed Corporation, Valley Forge, PA (US)

(72) Inventors: Robin M. Duarte, Newcastle, CA (US); Christopher C. Fisher, Philadelphia, PA (US)

(73) Assignee: CertainTeed Corporation, Malvern, PA (US)

( * ) Notice: Subject to any disclaimer, the term of this patent is extended or adjusted under 35 U.S.C. 154(b) by 0 days.

(21) Appl. No.: 14/209,562

(22) Filed: Mar. 13, 2014

(65) Prior Publication Data

US 2014/0259973 A1 Sep. 18, 2014

Related U.S. Application Data

(60) Provisional application No. 61/792,044, filed on Mar. 15, 2013.

(51) Int. Cl.
| E04D 13/14 | (2006.01) |
| H01L 31/048 | (2014.01) |
| E04D 13/147 | (2006.01) |
| H02S 20/25 | (2014.01) |

(52) U.S. Cl.
CPC ........ *H01L 31/0483* (2013.01); *E04D 13/1475* (2013.01); *H02S 20/25* (2014.12); *Y02B 10/12* (2013.01); *Y02B 10/20* (2013.01)

(58) Field of Classification Search
CPC ..... E04D 13/1475; H02S 20/25; Y02B 10/20; Y02B 10/12

USPC .......................................................... 52/58–60
See application file for complete search history.

(56) References Cited

U.S. PATENT DOCUMENTS

| 1,299,421 | A | * | 4/1919 | Boss ..................... E04D 13/155 52/278 |
| 3,188,772 | A | * | 6/1965 | Tennison, Jr. ........... E04D 13/15 52/11 |
| 3,579,940 | A | | 5/1971 | Greenleaf |
| 4,241,549 | A | * | 12/1980 | Hall, III ................ E04D 13/155 52/60 |

(Continued)

FOREIGN PATENT DOCUMENTS

| DE | 2422474 | * 11/1975 |
| DE | 2523575 A1 | * 11/1975 |

(Continued)

*Primary Examiner* — Adriana Figueroa
(74) *Attorney, Agent, or Firm* — McDonnell Boehnen Hulbert & Berghoff LLP

(57) ABSTRACT

The present invention relates more particularly to improved flashings for use in integrating specialized roof-mounted structures, such as photovoltaic devices for the generation of electrical energy, with conventional roofing materials on a roof. In one aspect, the invention provides a flashing element having a cross-sectional shape comprising a laterally-extending flange, the flange having an edge, a first end and a second end, the side flashing element comprising a return hem disposed at the edge and comprising a folded-over strip of material disposed over the top surface of the flange at the edge, the return hem having a first end disposed toward the first end of the edge, and a second end disposed toward the second end of the edge, wherein the total thickness of the return hem at its second end is no greater than the interior thickness of the return hem at its first end.

24 Claims, 12 Drawing Sheets

(56) References Cited

U.S. PATENT DOCUMENTS

| | | | |
|---|---|---|---|
| 5,189,853 A * | 3/1993 | Braine | E04D 13/15 52/219 |
| 5,457,057 A | 10/1995 | Nath et al. | |
| 5,522,189 A * | 6/1996 | Mortensen et al. | 52/200 |
| 5,968,287 A | 10/1999 | Nath | |
| 7,012,188 B2 | 3/2006 | Erling | |
| 7,138,578 B2 | 11/2006 | Komamine | |
| 7,506,477 B2 | 3/2009 | Flaherty et al. | |
| 7,997,027 B1 * | 8/2011 | Mischo | 47/65.9 |
| 8,141,306 B2 | 3/2012 | Masuda et al. | |
| 8,205,400 B2 * | 6/2012 | Allen | 52/173.3 |
| 8,869,466 B2 * | 10/2014 | Garcia | E04D 13/15 52/60 |
| 8,881,473 B2 * | 11/2014 | Lundsgaard et al. | 52/200 |
| 2005/0204647 A1 * | 9/2005 | Zdeb | E04D 1/30 52/58 |
| 2006/0196128 A1 | 9/2006 | Duke | |
| 2008/0264470 A1 | 10/2008 | Masuda et al. | |
| 2008/0289272 A1 | 11/2008 | Flaherty et al. | |
| 2008/0302030 A1 | 12/2008 | Stancel et al. | |
| 2008/0313976 A1 | 12/2008 | Allen | |
| 2010/0065108 A1 | 3/2010 | West et al. | |
| 2010/0313501 A1 * | 12/2010 | Gangemi | 52/173.3 |
| 2011/0083381 A1 | 4/2011 | David et al. | |
| 2011/0094560 A1 | 4/2011 | Keenihan et al. | |
| 2012/0186630 A1 | 7/2012 | Jenkins et al. | |
| 2012/0204490 A1 | 8/2012 | Lanigan et al. | |
| 2012/0210660 A1 | 8/2012 | Livsey et al. | |
| 2013/0055652 A1 * | 3/2013 | Larsson | C08F 20/62 52/60 |
| 2014/0102518 A1 | 4/2014 | Chihlas et al. | |

FOREIGN PATENT DOCUMENTS

| | | | |
|---|---|---|---|
| DE | 2752414 B1 * | 5/1979 | |
| DE | 9306064 * | 7/1996 | |
| EP | 2447438 A2 * | 5/2012 | |
| WO | WO 2004007864 A1 * | 1/2004 | E04D 13/147 |

* cited by examiner

930

ROOFING FLASHINGS AND ROOFING SYSTEMS AND PHOTOVOLTAIC ROOFING SYSTEMS USING THE SAME

CROSS-REFERENCE TO RELATED APPLICATIONS

This application claims the benefit of priority of U.S. Patent Application Ser. No. 61/792,044, filed Mar. 15, 2013, which is hereby incorporated herein by reference in its entirety.

BACKGROUND OF THE INVENTION

1. Field of the Invention

The present invention relates generally to roofing materials. The present invention relates more particularly to improved flashings for use in integrating specialized roof-mounted structures, such as photovoltaic devices for the generation of electrical energy, with conventional roofing materials on a roof.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as system performance has improved. They can be used, for example, to provide at least a significant fraction of the electrical energy needed for a building's overall function; or they can be used to power one or more particular devices, such as exterior lighting systems and well pumps.

Accordingly, research and development attention has turned toward the development of photovoltaic products that are adapted to be installed on a roof. While stand-alone photovoltaic modules have been in use for some time, they tend to be heavy and bulky, and aesthetically unfavorable when installed on a roof. Roofing products having photovoltaic cells integrated with roofing products such as shingles, shakes or tiles, or roofing panels have been proposed. Examples of such proposals have been disclosed in U.S. Patent Application Publications nos. 2006/0042683A1, 2008/0149163A1, 2010/0313499A1 and 2010/0313501A1, and in U.S. Pat. Ser. No. 4,040,867, each of which is hereby incorporated by reference herein in its entirety. A plurality of such photovoltaic roofing elements (i.e., including photovoltaic media integrated with a roofing product) can be installed together on a roof, and electrically interconnected to form a photovoltaic roofing system that provides both environmental protection and photovoltaic power generation. These can be very advantageous, but can be difficult to install on steep surfaces, while ensuring sufficient closure of the roof against the elements, particularly wind driven rain, and can often result in incomplete coverage of the roof surface with photovoltaic power generation. Moreover, as it is often desirable to have photovoltaic roofing elements covering a portion of a roof surface and conventional roofing products covering the remainder of the surface, there is a need for systems that provide aesthetic effect in the transition zone between the conventional roofing products and the photovoltaic roofing elements while closing the roof and the array of photovoltaic roofing elements to the environment. Because the photovoltaic roofing elements form part of the weather-protective roof covering, it is important that the transition between them and any conventional roofing elements is made in a way that retains weather-resistant performance.

SUMMARY OF THE INVENTION

One aspect of the invention is a flashing element having a cross-sectional shape comprising a laterally-extending flange, the flange having an edge, a first end and a second end, the flashing element comprising a return hem disposed at the edge and comprising a folded-over strip of material disposed over the top surface of the flange at the edge, the return hem having a first end disposed toward the first end of the edge, and a second end disposed toward the second end of the edge, wherein the total thickness of the return hem at its second end is no greater than the interior thickness of the return hem at its first end.

Another aspect of the invention is a flashing element having a vertically-extending feature, a flange extending laterally from the vertically-extending feature at the downward end thereof, the flange having an edge distal to the vertically-extending feature, a first end and a second end, the flashing element comprising an edgewall disposed at the edge and comprising a strip of material extending vertically from the top surface of the flange at the edge, the edgewall having a first end disposed toward the first end of the edge, and a second end disposed toward the second end of the edge, the flashing element including a vertically-extending feature from which the flange extends, wherein the total width of the flange at the second end of the edgewall is no greater than the interior width of the flange at the first end of the edgewall.

Another aspect of the invention is a flashing element having a cross-sectional shape comprising a laterally-extending flange, the flange having an edge, a first end and a second end, the flashing element comprising an edgewall disposed at the edge and comprising a strip of material extending vertically from the top surface of the flange at the edge, the edgewall having a first end disposed toward the first end of the edge, and a second end disposed toward the second end of the edge, the edgewall including a return feature disposed over the flange, wherein the total thickness of the edgewall at its second end is no greater than the interior thickness of the edgewall at its first end.

DETAILED DESCRIPTION

The invention will be further described with reference to certain aspects and embodiments depicted in the appended figures. It will be appreciated that elements in the figures are illustrated for simplicity and clarity and have not necessarily been drawn to scale. For example, the dimensions of some of the elements in the figures may be exaggerated relative to other elements to help to improve understanding of embodiments of the invention.

Figure 1:
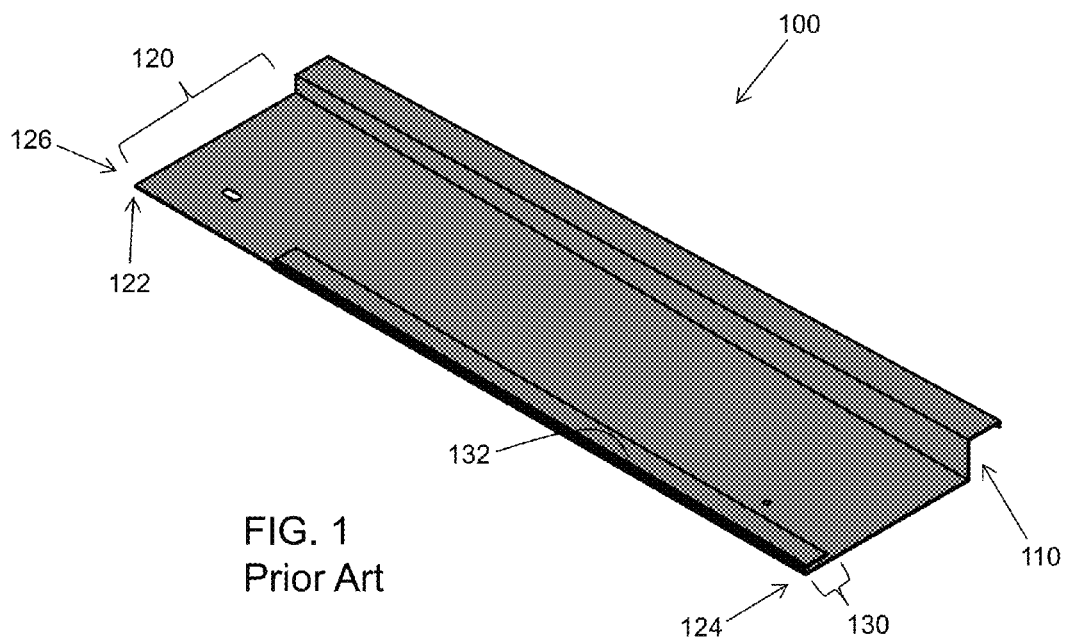
FIGS. 1 and 2 are schematic perspective views of two conventional side flashing elements.
Figure 2:
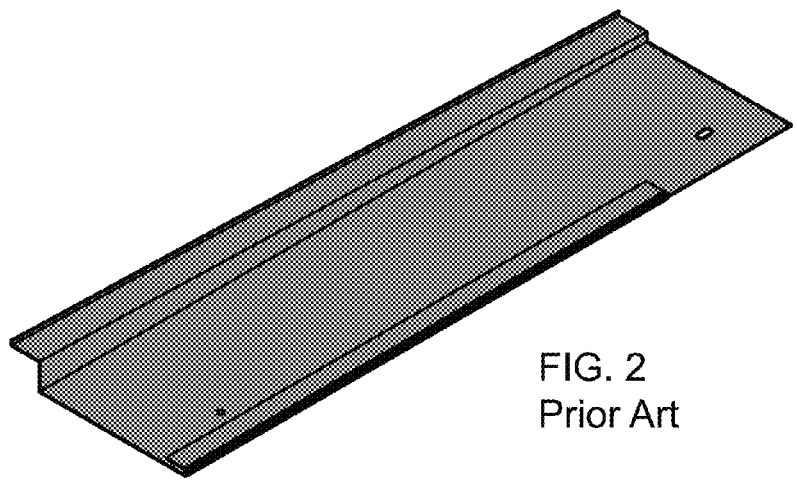

FIGS. 1 and 2 are schematic perspective views of two conventional side flashing elements suitable for use in the photovoltaic roofing systems described in U.S. Patent Application Publications nos. 2012/0210660 and 2012/0186630 and U.S. patent application Ser. No. 13/675,585, each of which is hereby incorporated by reference in its entirety. As described in the referenced documents, and in more detail below, these side flashings can be used in the closure of a roofing integrated photovoltaic array and the merging of the array into a field of shingles. The side flashing element of FIG. 1 can be used as a left-side flashing piece, and the side flashing element of FIG. 2 can be used as a right-side flashing piece. The side flashing element 100 of FIG. 1, for example, includes a vertically-extending feature 110, and a flange 120 extending away from the vertically extending feature from a lateral side at the downward end thereof. The flange 120 has an up-roof end 122 (i.e., to be disposed toward the ridge of a roof) and a down-roof end 124 (i.e., to be disposed toward the eave of a roof), and an edge 126 distal from the vertically-extending feature 110. Disposed at the distal edge 126 is a return hem 130, which is formed by a bent-over strip of material 132 disposed over the top surface of the flange at the distal edge. The return hem can help to direct any water reaching the flashing down the roof.

Figure 3:
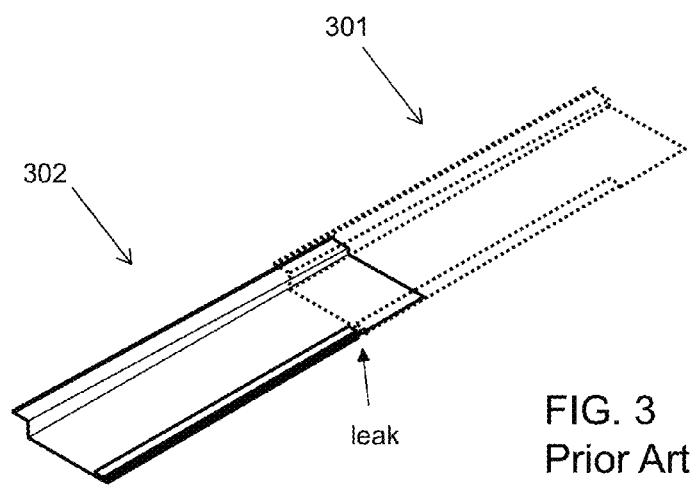
FIG. 3 is a schematic perspective view of two conventional side flashing elements linearly-arranged as installed.

In the conventional side flashing element of FIG. 1, the return hem does not extend to the up-roof end of the flange. Thus, when installed, linearly-arranged side flashing elements could overlap down the roof, with the hemmed return at the down-roof end of an overlying side flashing sitting on top of the flange of the underlying flashing in the area without the return hem, with the down-roof end of the return hem of the overlying side flashing element butting against the up-roof end of the return hem of the underlying side flashing, as shown in FIG. 3, with respect to underlying side flashing element 302 and overlying side flashing element 301. However, the absence of the side hem on part of each flashing element, and the interface where return hems of adjacent flashings abut one another cause potential leak points.

The present inventors have addressed these shortcomings by providing flashings that can nest together when they overlap, so that return hems or edgewalls are provided continuously along the roof when installed. This avoids the need to have a notch to allow parts to fit together, and thus removes a potential leak point from the installed system. The flashings disclosed herein can therefore provide improved water protection at the edge of the flashing.

In certain embodiments, the flashing element has a vertically-extending feature. In such embodiments, the flange extends away from a lateral side of the vertically-extending feature at the downward end thereof. The edge bearing the return hem or edgewall is distal to the vertically-extending feature.

The flashing elements as described herein can be configured, for example, as a side flashing element that is configured to be disposed with its first end as an up-roof end and its second end as a down-roof end, as described in more detail below. The side flashing element can be used to integrate conventional roofing materials on a roof with specialized roof-mounted structures, such as photovoltaic devices, along a side edge thereof. In other embodiments, the flashing elements as described herein can be configured as a top flashing element that is configured to be disposed substantially horizontally along a roof deck, as described in more detail below. The top flashing element can be used to integrate conventional roofing materials on a roof with specialized roof structures, such as photovoltaic devices, along a top edge thereof. The person of ordinary skill in the art will appreciate that, while flashing elements are described more particularly herein with respect to side flashing elements and top flashing elements, certain features described below can be applied to any flashing element as generally described or claimed herein.

One aspect of the invention is a side flashing element having a cross-sectional shape including a vertically-extending feature and a flange extending away from a lateral side at the downward end of the vertically extending feature. The flange has an up-roof end, a down-roof end, and an edge distal from the vertically-extending feature. The side flashing element includes a return hem disposed at the distal edge of the flange. The return hem includes a folded-over strip of material (i.e., of the flange) disposed over the top surface of the flange at the distal edge. The return hem has an up-roof end and a down-roof end. The total thickness of the return hem at its down-roof end is no greater than the interior thickness of the return hem at its up-roof end. In certain embodiments, the total width of the flange at its down-roof end is no greater than the interior width of the return hem on the flange at its up-roof end.

Figure 4:
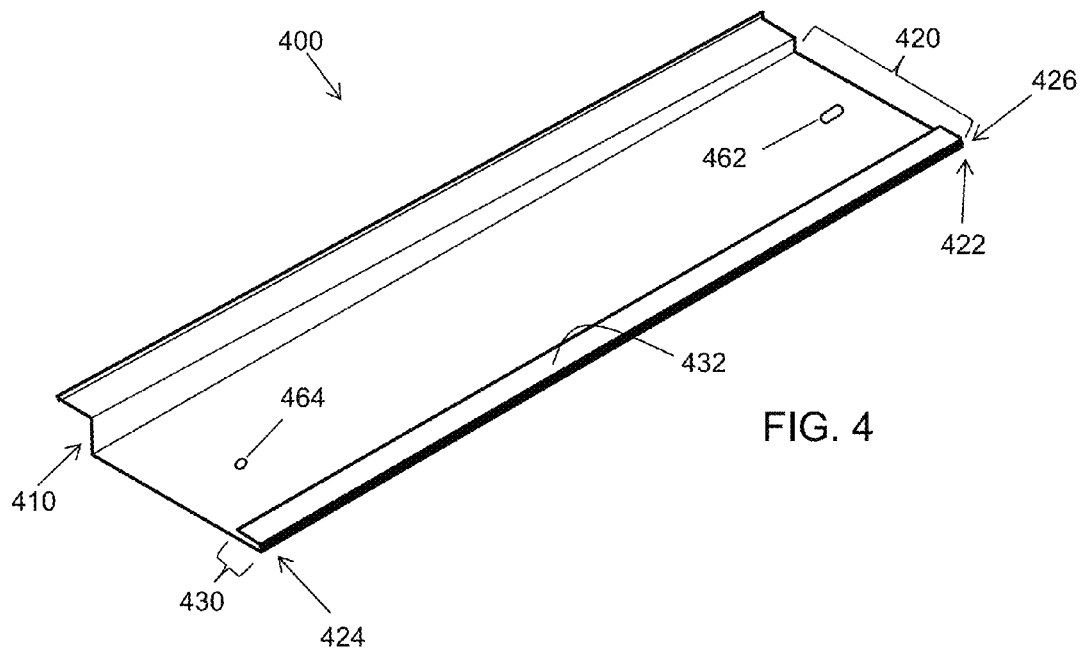
FIG. 4 is a schematic perspective view of a side flashing element according to one embodiment of the invention.

One embodiment of a side flashing element according to the invention is shown in perspective schematic view in FIG. 4. Side flashing element 400 includes a vertically-extending feature 410, and a flange 420 extending away from the vertically extending feature from a lateral side at the downward end thereof. The flange 420 has an up-roof end 422 (i.e., to be disposed toward the ridge of a roof) and a down-roof end 424 (i.e., to be disposed toward the eave of a roof), and an edge 426 distal from the vertically-extending feature 410. Disposed at the distal edge 426 is a return hem 430, which is formed by a bent-over strip of material 432 disposed over the top surface of the flange at the distal edge. The return hem 430 has an up-roof end and a down-roof end, in this embodiment each substantially coterminal with the up-roof end and the down-roof end, respectively, of the distal edge of the flange. The person of skill in the art will appreciate that in other embodiments, the up-roof end of the return hem is not substantially coterminal with (e.g., with an offset between 1 mm and 50 mm) the up-roof end of the distal edge, and/or the down-roof end of the return hem is not substantially coterminal with (e.g., with an offset between 1 mm and 50 mm) the down-roof end of the distal edge of the flange.

Figure 5:
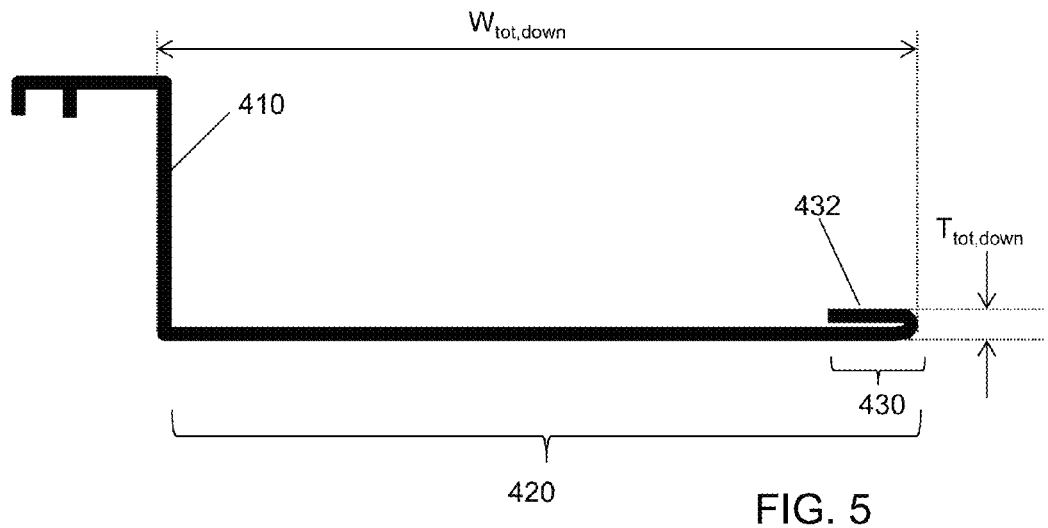
FIG. 5 is a cross-sectional schematic view of the side flashing element of FIG. 4 at its down-roof end.
Figure 6:
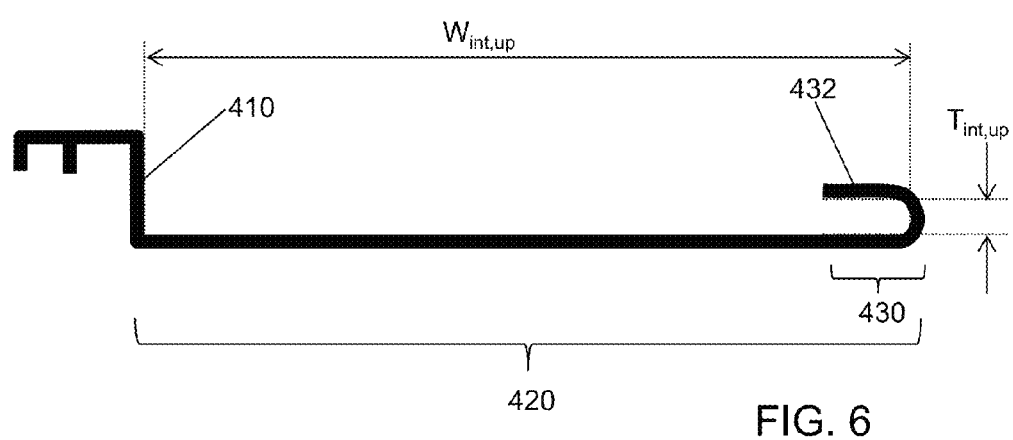
FIG. 6 is a cross-sectional schematic view of the side flashing element of FIG. 4 at its up-roof end.

A cross-sectional schematic view of the side flashing element of FIG. 4 at its down-roof end (indicated by reference numeral 424 in the schematic perspective view of FIG. 4) is shown in FIG. 5, and a cross-sectional schematic view of the side flashing element of FIG. 4 at its up-roof end (indicated by reference numeral 422 in the schematic perspective view of FIG. 4) is shown in FIG. 6. The total thickness of the return hem (i.e., the distance between the top surface of the strip of material forming the return hem and the bottom surface of the flange) at its down-roof end is indicated in FIG. 5 by $T_{tot,down}$. The interior thickness of the return hem (i.e., the distance between the bottom surface of the strip of material forming the return hem and the top surface of the flange) at its up-roof end is indicated in FIG. 6 by $T_{int,up}$. Notably, in this embodiment, the total thickness of the return hem at its down-roof end is no greater than the interior thickness of the return hem at its up-roof end. Accordingly, when such side flashing elements are arranged up the roof in an overlapping manner, the return hem at the down-roof end of an overlying side flashing element can nest within the return hem at the up-roof end of an underlying side flashing element, as shown in cross-sectional schematic view in FIG. 7, with reference to overlying side flashing element 402 and underlying side flashing element 401.

In certain embodiments, the total thickness of the return hem at its down-roof end is less than the interior thickness of the return hem at its up-roof end by at least about at least about 0.2, at least about 0.5 mm, at least about 1 mm, or even at least about 2 mm. In certain such embodiments, the total thickness of the return hem at its down-roof end is less than the interior thickness of the return hem at its up-roof end by no more than about 10 mm, about 5 mm, about 2 mm or even about 1 mm.

Figure 8:
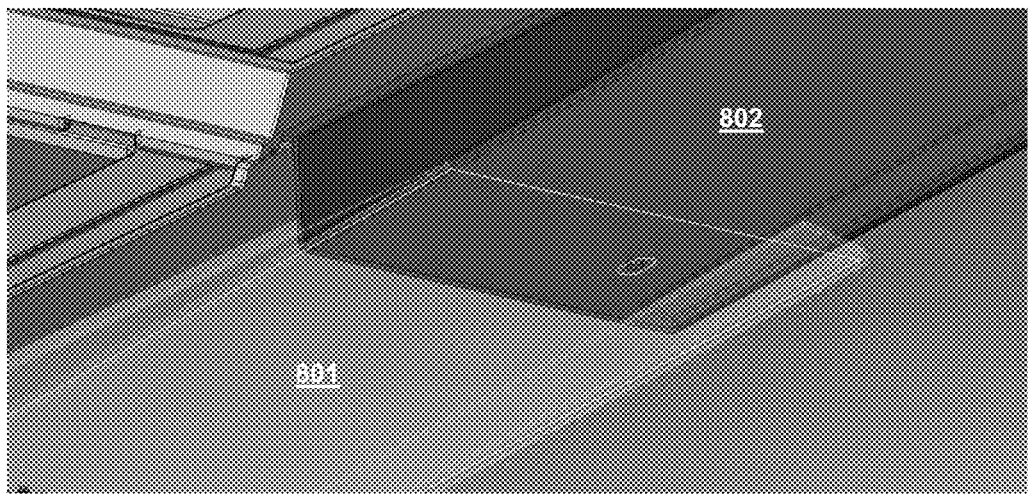
FIG. 8 is a perspective partial schematic view of a photovoltaic roofing system including side flashings according to one embodiment of the invention.

FIG. 8 is a perspective partial schematic view of a photovoltaic roofing system including side flashings according to one embodiment of the invention. The other aspects of the photovoltaic roofing system are similar to those described in U.S. Patent Application Publications nos. 2012/0210660 and 2012/0186630 and U.S. patent application Ser. No. 13/675,585, each of which is hereby incorporated by reference in its entirety, and in the commercially available APOLLO™ roofing systems available from CertainTeed Corporation. Here, the return hem of an overlying side flashing 802 nests within the return hem of underlying side flashing 801.

In certain embodiments, the internal width of the flange at the up-roof end of the return hem (i.e., the distance at the up-roof end of the return hem between the inside surface of the vertically-extending feature at the bottom end thereof and the inside surface of the return hem) is greater than the total width of the flange at the down-roof end of the return hem (i.e., the distance at the down-roof end of the return hem between the outer surface of the vertically-extending feature at the bottom end thereof and the outer surface of the return hem). For example, in the cross-sectional schematic view of FIG. 5, the total width of the flange at the down-roof end of the return hem is indicated by $W_{tot,down}$. The interior width of the flange at the up-roof end of the return hem is indicated in FIG. 6 by $W_{int,up}$. This relationship can help the side flashing elements nest as described above with respect to the cross-sectional view of FIG. 7. In certain embodiments, the internal width of the flange at the up-roof end of the return hem is greater than the total width of the flange at the down-roof end of the return hem by at least about 0.2, at least about 0.5 mm, at least about 1 mm, at least about 2 mm or at least about 5 mm. In certain such embodiments, the internal width of the flange at the up-roof end of the return hem is greater than the total width of the flange at the down-roof end of the return hem by no more than about 20 mm, about 10 mm, about 5 mm or about 2 mm.

Figure 7:
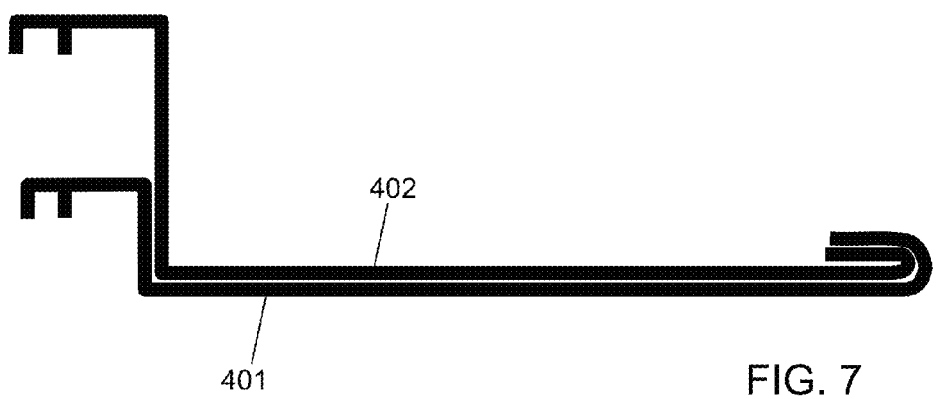
FIG. 7 is a cross-sectional schematic view of two side flashing elements of FIGS. 4-6 arranged in an overlapping manner.

Assemblies of side flashing elements according to various embodiments of the present invention can be advantaged over conventional side flashing elements. In the conventional assembly (e.g., as shown in FIG. 3), a potential leak point exists where the return hem of the underlying side flashing element is cut away to allow placement of the overlying side flashing element (shown generally by the arrow marked "leak." In the assembly of side flashing elements according to various embodiments of the present invention (e.g., as shown in FIGS. 7 and 8), the internal width of the flange of the underlying side flashing element at the up-roof end of the return hem is slightly wider than the total width of the flange at the down-roof end of the return hem, such that the two elements can efficiently nest with one another in order to provide a more certain barrier to moisture. Accordingly, it is not necessary to notch and remove part of the return hem at the up-roof end of the side flashing element. In certain embodiments (e.g., in the configuration shown in FIG. 4), the return hem is folded such that the total width of the flange at the down-roof end of the return hem is about 3⅞ inch (about 98 mm) and the total width of the flange at the up-roof end of the return hem is slightly greater than 4 inches (slightly greater than about 101 mm); the thickness of the material is such that the internal width of the flange at the up-roof end of the return hem is greater than the total width of the flange at the down-roof end of the return hem, and the total thickness of the return hem at its down-roof end is no greater than the interior thickness of the return hem at its up-roof end, so that the side flashing elements can nest together at their overlapping ends.

In certain embodiments, it can be desirable for linearly-arranged side flashing elements as described herein to nest together over an extending overlapping length. For example, the extending overlapping length can be at least about 5 mm, at least about 10 mm, at least about 20 mm, at least about 35 mm, at least about 50 mm, or even at least about 100 mm. Accordingly, in certain embodiments, the total thickness of the return hem within a distance of at least about 5 mm, at least about 10 mm, at least about 20 mm, at least about 35 mm, at least about 50 mm, or even at least about 100 mm from its down-roof end is no greater than the interior thickness of the return hem within an equivalent distance from its up-roof end. Particular thickness relationships over these distances can be as described elsewhere herein. Similarly, in certain embodiments, the internal width of the flange within a distance of at least about 5 mm, at least about 10 mm, at least about 20 mm, at least about 35 mm, or even at least about 50 mm from the up-roof end of the return hem is greater than the total width of the flange within an equivalent distance from the down-roof end of the return hem. Particular width relationships over these distances can be as described elsewhere herein. For example, in various embodiments (e.g., as shown in FIG. 4), the side flashing elements nest together over a distance greater than about 50 mm (and even greater than about 70 mm). Accordingly, in various embodiments (e.g., as shown in FIG. 4), the total thickness of the return hem within a distance of at least about 50 mm from its down-roof end is no greater than the interior thickness of the return hem within a distance of at least about 50 mm from its up-roof end; and the internal width of the flange within a distance of at least about 50 mm from the up-roof end of the return hem is greater than the total width of the flange within a distance of at least about 50 mm from the down-roof end of the return hem.

Figure 9:
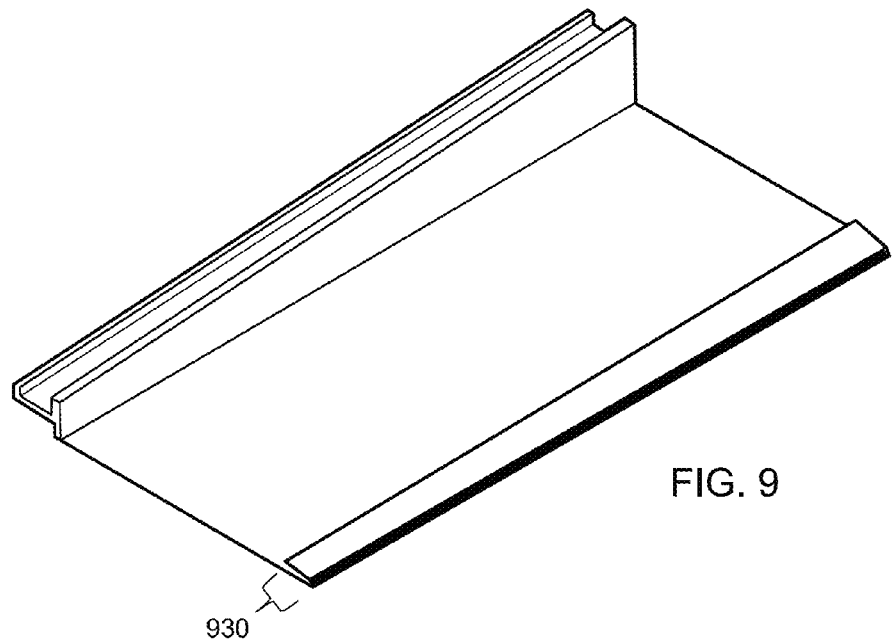
FIG. 9 is a side perspective schematic view of a side flashing element according to another embodiment of the invention.

Another embodiment of the invention is a side flashing element as shown in side perspective view in FIG. 9. The side flashing element of FIG. 9 includes a return hem 930, which can be as described above. Uses of the side flashing elements of FIGS. 1-9 are described, for example, in U.S. Patent Application Publications nos. 2012/0210660 and 2012/0186630 and U.S. patent application Ser. No. 13/675,585, each of which is hereby incorporated herein by reference its entirety. For example, the flange may be extending away from an array of photovoltaic roofing elements, with the vertically-extending feature interlocking with a feature on the photovoltaic roofing element to provide a weather-resistant coverage. Conventional roofing elements such as shingles, tiles, panels or shakes can be disposed on the flange, thus providing continuous roof coverage.

Figure 10:
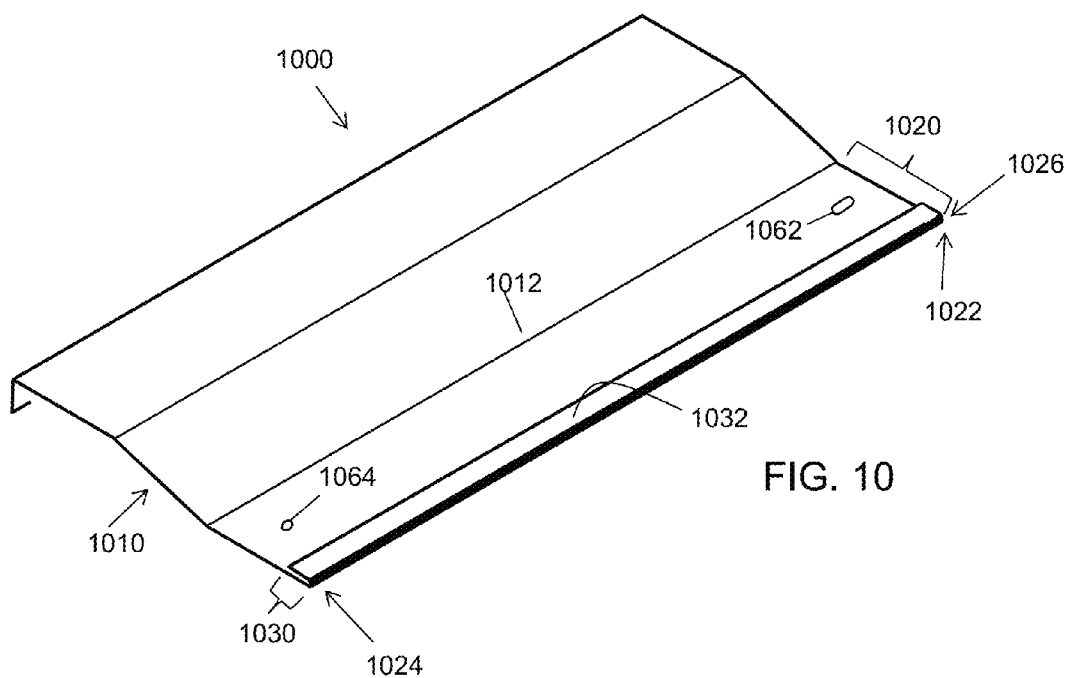
FIG. 10 is a perspective schematic view of a top flashing element according to another embodiment of the invention.

Another embodiment of the invention is a top flashing element, shown in perspective schematic view in FIG. 10. Top flashing element 1000 includes a vertically-extending feature 1010—here, the up-sloped region of the flashing, which begins at the crease 1012—and a flange 1020 extending away from the vertically extending feature from a lateral side at the downward end thereof. The flange 1020 has a first end 1022 (e.g., to be disposed toward one lateral edge of the roof), and a second end 1024 (i.e., to be disposed toward the other lateral edge of a roof), and an edge 1026 distal from the vertically-extending feature 1010. Disposed at the distal edge 1026 is a return hem 1030, which is formed by a bent-over strip of material 1032 disposed over the top surface of the flange at the distal edge. The return hem 1030 has a first end and a second end, in this embodiment coterminal with the first end and the second end, respectively, of the distal edge. The person of skill in the art will appreciate that in other embodiments, the first end of the return hem is not coterminal with the first end of the distal edge, and/or the second end of the return hem is not coterminal with the second end of the distal edge. Notably, in this embodiment, the total thickness of the return hem at its second end is no greater than the interior thickness of the return hem at its first end, for example, as described above with respect to FIGS. 5 and 6. Accordingly, when such top flashing elements are arranged along the roof in an overlapping manner, the return hem at the second end of an overlying top flashing element can nest within the return hem at the first end of an underlying top flashing element, as described above with respect to FIG. 7.

Figure 11:
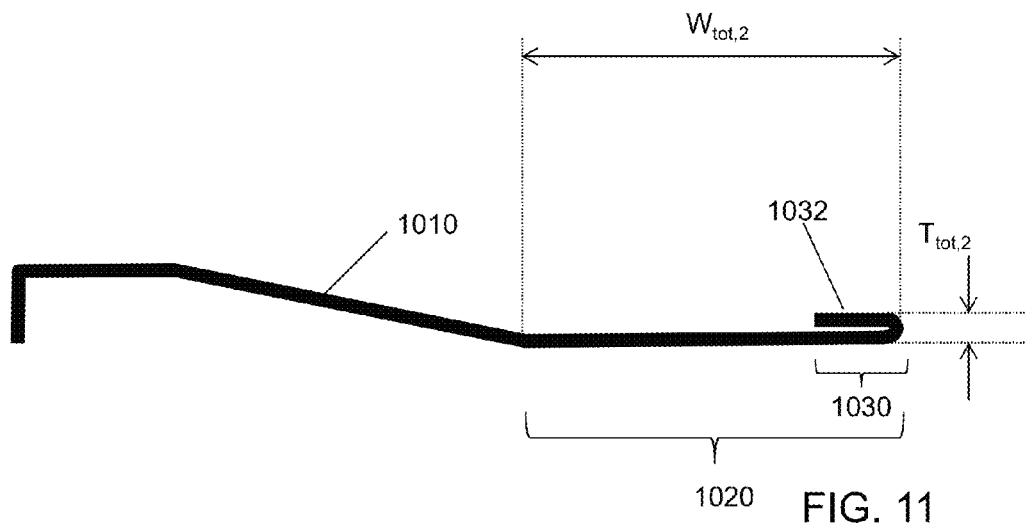
FIG. 11 is a cross-sectional schematic view of the top flashing element of FIG. 10 at its second end.
Figure 12:
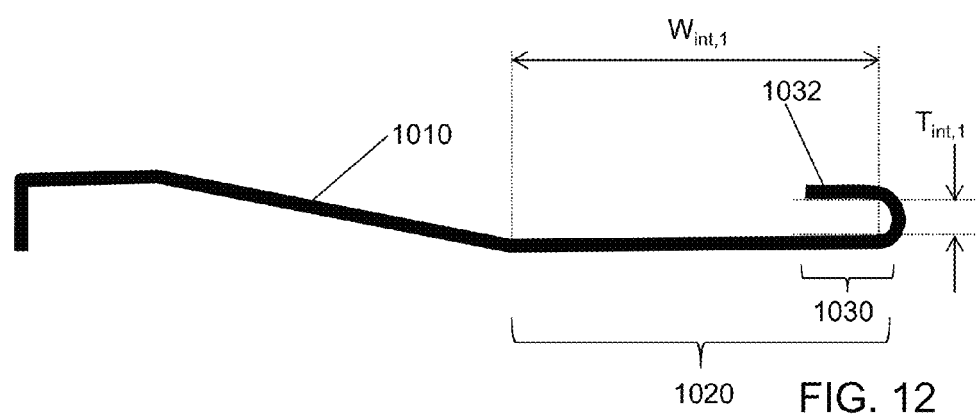
FIG. 12 is a cross-sectional schematic view of the top flashing element of FIG. 10 at its first end.

A cross-sectional schematic view of the top flashing element of FIG. 10 at its second end (indicated by reference numeral 1024 in the schematic perspective view of FIG. 10) is shown in FIG. 11, and a cross-sectional schematic view of the top flashing element of FIG. 10 at its first end (indicated by reference numeral 1022 in the schematic perspective view of FIG. 10) is shown in FIG. 12. The total thickness of the return hem (i.e., the distance between the top surface of the strip of material forming the return hem and the bottom surface of the flange) at the second end of the flange is indicated in FIG. 11 by $T_{tot,2}$. The interior thickness of the return hem (i.e., the distance between the bottom surface of the strip of material forming the return hem and the top surface of the flange) at its first end is indicated in FIG. 11 by $T_{int,1}$. Notably, in this embodiment, the total thickness of the return hem at its second end is no greater than the interior thickness of the return hem at its first end. Accordingly, when such top flashing elements are arranged along the roof in an overlapping manner, the return hem at the second end of an overlying top flashing element can nest within the return hem at the first end of an underlying top flashing element, as shown in cross-sectional schematic view in FIG. 12, with reference to overlying top flashing element 1002 and underlying top flashing element 1001.

In certain embodiments, the total thickness of the return hem at its second end is less than the interior thickness of the return hem at its first end by at least about at least about 0.2, at least about 0.5 mm, at least about 1 mm, or even at least about 2 mm. In certain such embodiments, the total thickness of the return hem at its second end is less than the interior thickness of the return hem at its first end by no more than about 10 mm, about 5 mm, about 2 mm or even about 1 mm.

Figure 13:
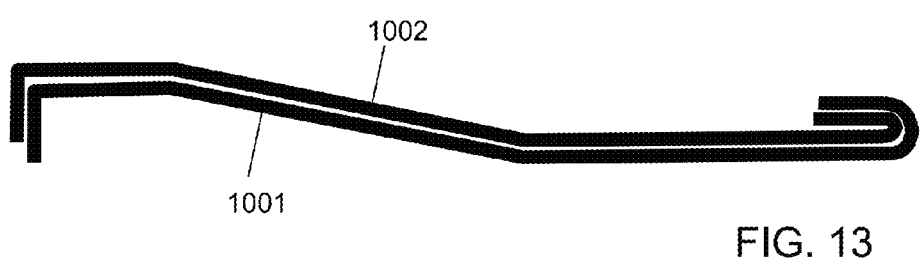
FIG. 13 is a cross-sectional schematic view of two top flashing elements of FIGS. 10-12 arranged in an overlapping manner.

In certain embodiments, the internal width of the flange at the first end of the return hem (i.e., the distance at the first end of the return hem between the inside surface of the vertically-extending feature at the bottom end thereof and the inside surface of the return hem) is greater than the total width of the flange at the second end of the return hem (i.e., the distance at the second end of the return hem between the outer surface of the vertically-extending feature at the bottom end thereof and the outer surface of the return hem). For example, in the cross-sectional schematic view of FIG. 11, the total width of the flange at the second end of the return hem is indicated by $W_{tot,2}$. The interior width of the flange at the first end of the return hem is indicated in FIG. 6 by $W_{int,1}$. This relationship can help the top flashing elements nest as described above with respect to the cross-sectional view of FIG. 13. In certain embodiments, the internal width of the flange at the first end of the return hem is greater than the total width of the flange at the second end of the return hem by at least about 0.2, at least about 0.5 mm, at least about 1 mm, at least about 2 mm or at least about 5 mm. In certain such embodiments, the internal width of the flange at the up-roof end of the return hem is greater than the total width of the flange at the down-roof end of the return hem by no more than about 20 mm, about 10 mm, about 5 mm or about 2 mm.

Uses of the top flashing elements of FIGS. 10-13 are described, for example, in U.S. Patent Application Publications nos. 2012/0210660 and 2012/0186630 and U.S. patent application Ser. No. 13/675,585, each of which is hereby incorporated herein by reference its entirety. For example, the flange may be disposed up the roof from the remainder of the top flashing element, with the remainder of the top flashing element disposed up and over the top edge of an array of photovoltaic roofing elements. Conventional roofing elements such as shingles, tiles, panels or shakes can be disposed on the flange, thus providing continuous roof coverage.

In certain embodiments, the flashing element includes one or more mounting holes formed in the flange, for use in mounting the flashing to the roof surface. The mounting holes can be disposed toward opposite ends of the flange. For example, in the embodiment of FIG. 10, mounting hole 1062 is disposed toward the first end of the flange 1022, and mounting hole 1064 is disposed toward the second end of the flange 1024. And in the embodiment of FIG. 4, mounting hole 462 is disposed toward the up-roof end, and mounting hole 464 is disposed toward the down-roof end 424. In certain embodiments (and as exemplified by mounting hole 462 in FIG. 4 and mounting hole 1064 in FIG. 12), one (or more) of the mounting holes can be slotted (i.e., longer along the axis of the edge of the flashing element). Use of slotted mounting holes can allow flexibility in relative positioning of the overlapping flashing elements, for example, to accommodate a fit of the part into the edge of the array, to allow for a degree of irregularity or nonplanarity in the roof surface, and to provide for thermal expansion and contraction during use. When installed, the flashing elements can be disposed so that the mounting holes of adjacent flashing elements are aligned, such that a single fastener can be used with both. In certain embodiments, a slotted mounting hole is toward the first end of the flange, and a non-slotted (e.g., round or regular polygonal) mounting hole is toward the second end of the flange. When installed, a fastener can be disposed through the mounting hole toward the second end of the overlying flashing element and the mounting hole toward the first end of the underlying flashing element. This configuration can be advantageous in that the overlying flashing element has the smaller hole, which helps to ensure watertight operation, while the slotted hole of the underlying flashing element allows some adjustability as to where the overlying part is firmly fastened to accommodate roof plane variation. A caulk or a sealant can be disposed over the fastener and the holes to provide additional water resistance.

Figure 14:
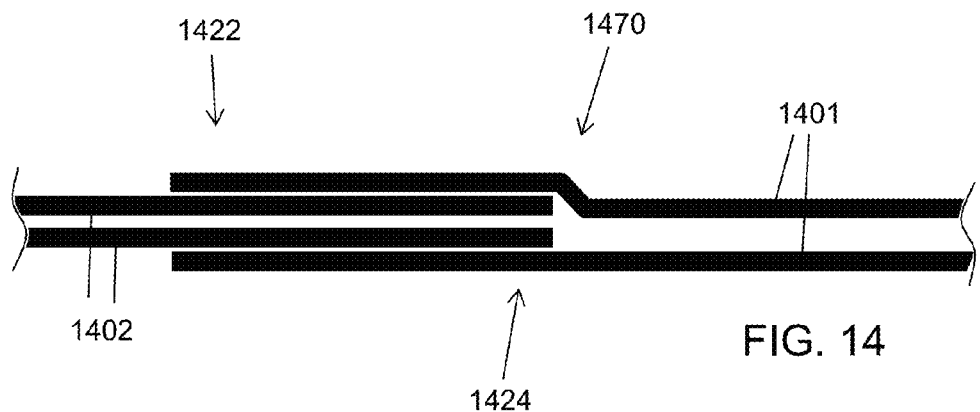
FIG. 14 is a partial cross-sectional schematic view of two flashing elements nested together according to one embodiment of the invention.
Figure 15:
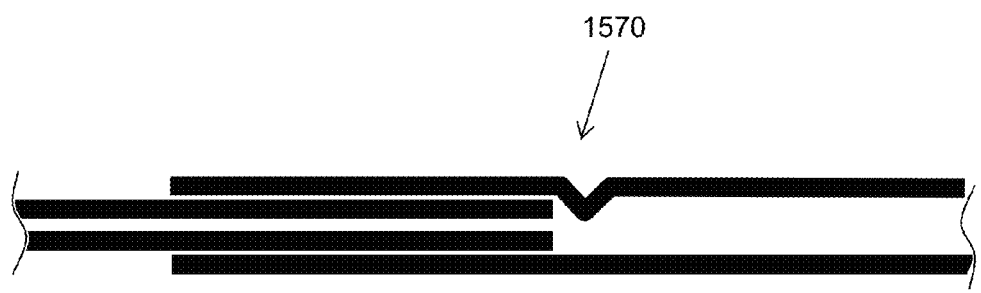
FIG. 15 is a partial cross-sectional schematic view of two flashing elements nested together according to another embodiment of the invention.

In certain embodiments, the return hem includes a discontinuity, at which the inside thickness of the return hem transitions, in a direction going from the first end or up-roof end of the return hem, from substantially greater than the total thickness of the return hem at its second end or down-roof end (i.e., such that the second end or down-roof end of an overlying, nesting return hem can slide) to substantially less than the total thickness of the return hem at its second end or down-roof end (i.e., such that the second end or down-roof end of an overlying, nesting return hem cannot move beyond that point within the return hem). The transition can be made, for example, over a distance along the return hem of less than 10 mm, less than 5 mm, or even less than 2 mm. Notably, the narrowed area of the return hem need not continue throughout the remainder of the return hem. Thus, the discontinuity can take the form of a crimp or a bend in the return hem, or some other mechanical stop in the return hem. This relationship is shown in partial cross-sectional schematic view in FIG. 14, which for simplicity depicts only the upper and lower parts of each return hem. The second end 1424 of overlying flashing element 1402 is nested within the first end of underlying flashing element 1401. The return hem of the underlying flashing element 1401 includes a discontinuity 1470 as described above. In the embodiment of FIG. 14, the discontinuity is a bend. In the embodiment of FIG. 15, the discontinuity is a crimp. The discontinuity can act as a mechanical stop to help ensure proper relative placement of the overlapping flashing pieces.

Figure 16:
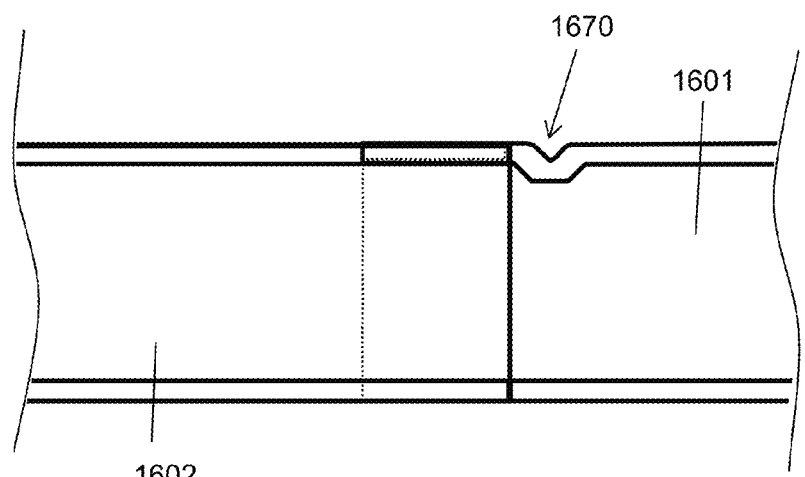
FIG. 16 is a partial schematic plan view of two flashing elements nested together according to another embodiment of the invention.

In other embodiments, the return hem includes a discontinuity, at which the inside width of the return hem transitions, in a direction going from the first end or up-roof end of the return hem, from substantially greater than the total width of the return hem at its second end or down-roof end (i.e., such that the second end or down-roof end of an overlying, nesting return hem can slide) to substantially less than the total width of the return hem at its second end or down-roof end (i.e., such that the second end or down-roof end of an overlying, nesting return hem cannot move beyond that point within the return hem). The transition can be made, for example, over a distance along the return hem of less than 10 mm, less than 5 mm, or even less than 2 mm. Notably, the narrowed area of the return hem need not continue throughout the remainder of the return hem. Thus, the discontinuity can take the form of a crimp or a bend in the return hem, or some other mechanical stop in the return hem. This relationship is shown in partial cross-sectional top view in FIG. 16. The second end of overlying flashing element 1602 is nested within the first end of underlying flashing element 1601. The return hem of the underlying flashing element 1601 includes a discontinuity 1670 as described above. In the embodiment of FIG. 16, the discontinuity is a crimp. As described above, the discontinuity can act as a mechanical stop to help ensure proper relative placement of the overlapping flashing pieces. It will be understood that the discontinuity in the geometry of the return hem of the flashing element may be in the vertical or thickness direction of the return hem or in the width of the flange and return hem, or a combination thereof.

In certain embodiments, the return hem has width of at least about 3 mm, at least about 5 mm, at least about 8 mm, or even at least about 12 mm. In certain embodiments, the return hem has a width of no greater than about 100 mm, or even no greater than about 60 mm.

Figure 17:
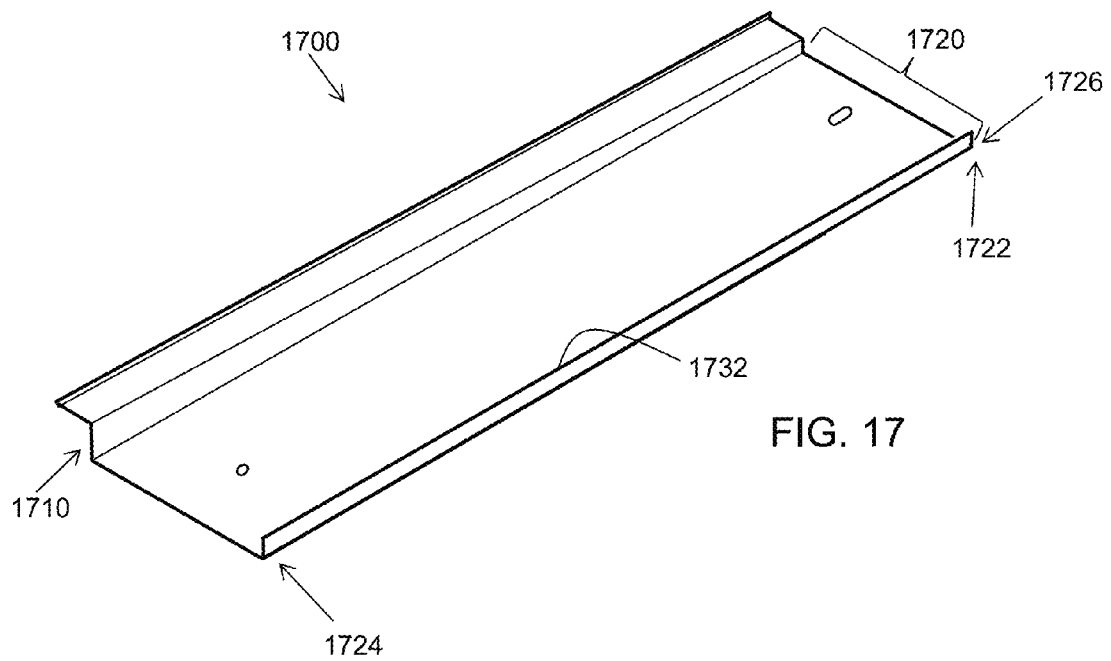
FIG. 17 is a schematic perspective view of a flashing element according to another embodiment of the invention.

Another embodiment of the invention is shown in perspective schematic view in FIG. 17. In this embodiment, the flashing element has an edgewall instead of a return hem. The person of ordinary skill in the art that features described above with respect to flashing elements having a return hem can be applied similarly to flashing elements having sidewalls. Moreover, while the embodiment of FIG. 17 is described with respect to a side flashing element, the person of ordinary skill in the art will appreciate that edgewalls can be used with other flashings, such as top flashing elements and other types of flashing elements for other applications. In FIG. 17, Side flashing element 1700 includes a vertically-extending feature 1710, and a flange 1720 extending away from the vertically extending feature from a lateral side at the downward end thereof. The flange 1720 has an up-roof end 1722 (i.e., to be disposed toward the ridge of a roof) and a down-roof end 1724 (i.e., to be disposed toward the eave of a roof), and an edge 1726 distal from the vertically-extending feature 1710. Disposed at the distal edge 1726 is an edgewall 1732, which extends vertically from the top surface of the flange at the end. The edgewall can, for example, be formed from a strip of the material of the flange, bent at the appropriate angle. The edgewall has an up-roof end and a down-roof end, in this embodiment each substantially coterminal with the up-roof end and the down-roof end, respectively, of the distal edge of the flange. The person of skill in the art will appreciate that in other embodiments, the up-roof end of the edgewall is not substantially coterminal with (e.g., with an offset between 1 mm and 50 mm) the up-roof end of the distal edge, and/or the down-roof end of the edgewall is not substantially coterminal with (e.g., with an offset between 1 mm and 50 mm) the down-roof end of the distal edge of the flange.

Figure 18:
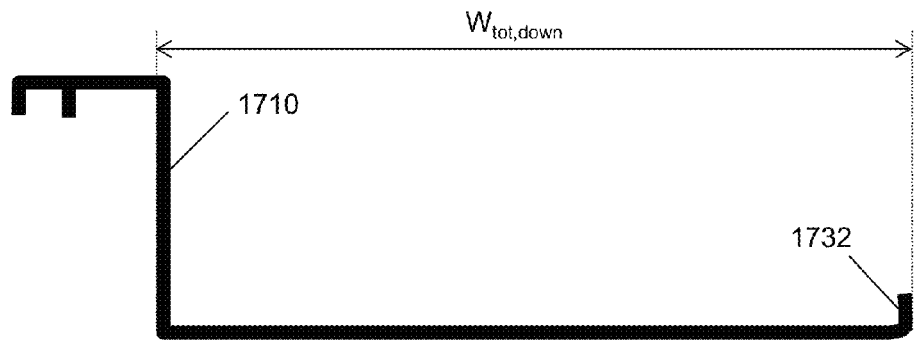
FIG. 18 is a cross-sectional schematic view of the flashing element of FIG. 17 at its down-roof end.
Figure 19:
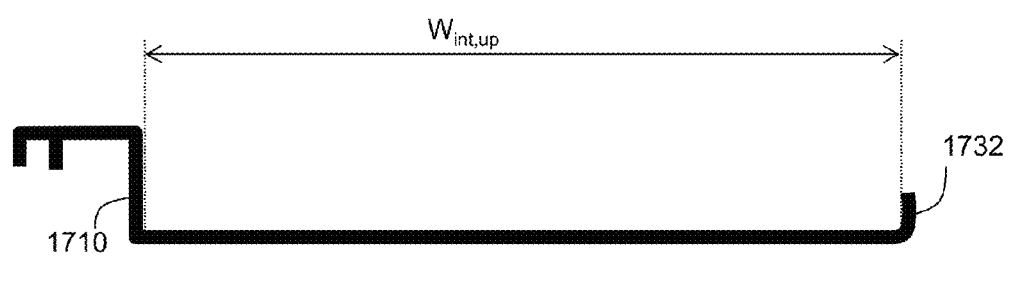
FIG. 19 is a cross-sectional schematic view of the top flashing element of FIG. 17 at its up-roof end.
Figure 20:
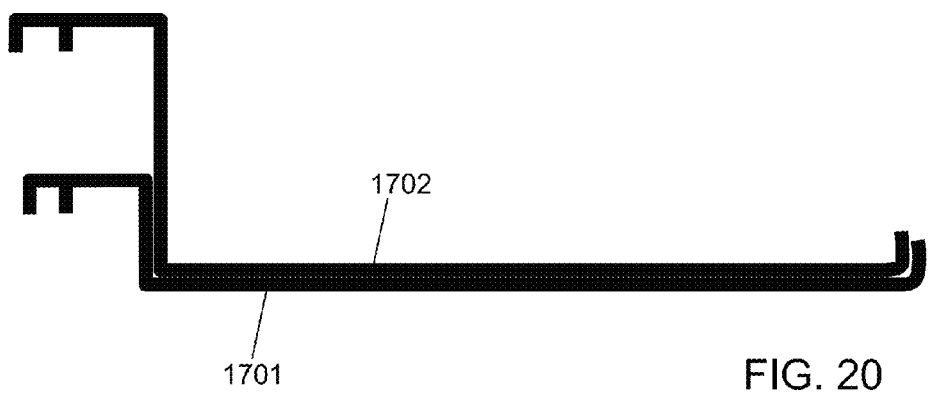
FIG. 20 is a cross-sectional schematic view of two top flashing elements of FIGS. 17-19 arranged in an overlapping manner.

A cross-sectional schematic view of the side flashing element of FIG. 17 at its down-roof end (indicated by reference numeral 1724 in the schematic perspective view of FIG. 17) is shown in FIG. 18, and a cross-sectional schematic view of the side flashing element of FIG. 17 at its up-roof end (indicated by reference numeral 1722 in the schematic perspective view of FIG. 17) is shown in FIG. 19. The internal width of the flange at the up-roof end of the edgewall (i.e., the distance at the up-roof end of the edgewall between the inside surface of the vertically-extending feature at the bottom end thereof and the inside surface of the edgewall at the bottom end thereof) is greater than the total width of the flange at the down-roof end of the edgewall (i.e., the distance at the down-roof end of the edgewall between the outer surface of the vertically-extending feature at the bottom end thereof and the outer surface of edgewall at the bottom end thereof). For example, in the cross-sectional schematic view of FIG. 17, the total width of the flange at the down-roof end of the edgewall is indicated by $W_{tot,down}$. The interior width of the flange at the up-roof end of the edgewall is indicated in FIG. 19 by $W_{int,up}$. This relationship can help the side flashing elements nest as described above with respect to the cross-sectional view of FIG. 20. In certain embodiments, the internal width of the flange at the up-roof end of the edgewall is greater than the total width of the flange at the down-roof end of the edgewall by at least about 0.2, at least about 0.5 mm, at least about 1 mm, at least about 2 mm or at least about 5 mm. In certain such embodiments, the internal width of the flange at the up-roof end of the edgewall is greater than the total width of the flange at the down-roof end of the edgewall by no more than about 20 mm, about 10 mm, about 5 mm or about 2 mm.

In certain embodiments, the edgewall has a height (i.e., vertical distance from the flange to the top end of the edgewall) of less than about 25 mm, less than about 15 mm, or even less than about 10 mm. In certain embodiments the edgewall has a height of at least about 3 mm. In certain embodiments, the edgewall is formed with an angle of no greater than about 135°, no greater than about 120°, no greater than about 105°, or even no greater than about 90° with respect to the flange.

Figure 21:
FIG. 21 is a cross-sectional schematic view of a flashing element according to another embodiment of the invention at its down-roof end.
Figure 22:
FIG. 22 is a cross-sectional schematic view of the top flashing element of FIG. 21 at its up-roof end.
Figure 23:
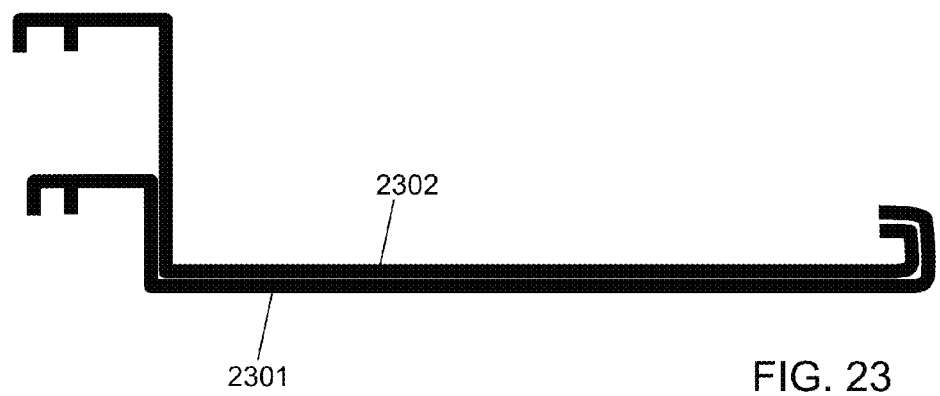
FIG. 23 is a cross-sectional schematic view of two top flashing elements of FIGS. 21 and 22 arranged in an overlapping manner.

In certain embodiments, the edgewall includes a return feature disposed over the flange at the top end of the edgewall. The return feature can be formed from a strip of material of the edgewall, folded over to provide the desired return feature. A cross-sectional schematic view of such a flashing element at its down-roof end is shown in FIG. 21, and a cross-sectional schematic view of the same flashing element at its up-roof is shown in FIG. 22. The total thickness of the edgewall (i.e., the distance between the top surface of the return feature and the bottom surface of the flange) at the down-roof end of the return feature is indicated in FIG. 21 by $T_{tot,2}$. The interior thickness of the edgewall (i.e., the distance between the bottom surface of the strip of material forming the return feature and the top surface of the flange) at the up-roof end of the return feature is indicated in FIG. 22 by $T_{int,1}$. Notably, in this embodiment, the total thickness of the edgewall at the down-roof end of the return feature is no greater than the interior thickness of the edgewall at the up-roof end of the return feature. Accordingly, when such side flashing elements are arranged up the roof in an overlapping manner, the edgewall at the down-roof end of an overlying side flashing element can nest within the edgewall at the up-roof end of an underlying side flashing element, as shown in cross-sectional schematic view in FIG. 23, with reference to overlying side flashing element 2302 and underlying side flashing element 2301. In certain embodiments, the total thickness of the edgewall at its down-roof end is less than the interior thickness of the edgewall at its up-roof end by at least about at least about 0.2, at least about 0.5 mm, at least about 1 mm, or even at least about 2 mm. In certain such embodiments, the total thickness of the edgewall at its down-roof end is less than the interior thickness of the edgewall at its up-roof end by no more than about 10 mm, about 5 mm, about 2 mm or even about 1 mm.

In certain embodiments, the return feature has width of at least about 3 mm, at least about 5 mm, at least about 8 mm, or even at least about 12 mm. In certain embodiments, the return feature has a width of no greater than about 100 mm, or even no greater than about 60 mm.

The edgewalls and/or the return features of the embodiments of FIGS. 18-23 can include a discontinuity, as described above.

As the person of ordinary skill in the art will appreciate, in another aspect of the invention, a flashing element has, formed at the first end of the edge, an edgewall, (for example, as described above with respect to any of FIGS. 18-23), and at the second end of the edge, a return hem (for example, as described above with respect to any of FIGS. 1-17). Accordingly, when two such flashing elements are disposed upon a roof in an overlapping fashion, the return hem at the second end of the edge of the overlying flashing element can nest within the edgewall of the first end of edge of the underlying flashing element. In such cases, the return hem can be envisioned as having an edgewall with a return feature, as described above with respect to FIGS. 21-23, in which the height of the edgewall is minimal. Accordingly, as the person or ordinary skill in the art will appreciate, the features described herein with respect to the edgewalls and return features can be applied to the return hem at the second end of the edge in such embodiments of the invention.

Moreover, the person of ordinary skill in the art will appreciate that a variety of other combinations of nesting features (e.g., return hems, edgewalls with or without a return feature) are possible. Accordingly, another aspect of the invention relates to a flashing element having a cross-sectional shape comprising a vertically-extending feature, a flange extending laterally from the vertically-extending feature at the downward end thereof, the flange having an edge, a first end and a second end, the flashing element comprising a first edge structure disposed toward the first end of the edge, the first edge structure being selected from a return hem, an edgewall without a return feature, an edgewall with a return feature, the first edge structure having a first end disposed toward a first end of the edge and a second end disposed toward the second end of the edge, the flashing element further comprising a second edge structure disposed toward the second end of the edge with respect to the first edge structure, the second edge structure being selected from an edgewall without a return feature, an edgewall with a return feature and a return hem, the second edge structure having a first end disposed toward a first end of the edge and a second end disposed toward the second end of the edge, wherein the total width of the flange at the second end of the second edge structure is no greater than the interior width of the flange at the first end of the first edge structure. Similarly, another aspect of the invention is a flashing element having a cross-sectional shape comprising a laterally-extending flange, the flange having an edge, a first end and a second end, the flashing element comprising a first edge structure disposed toward the first end of the edge, the first edge structure being selected from a return hem, an edgewall without a return feature and an edgewall with a return feature, the first edge structure having a first end disposed toward a first end of the edge of the flange and a second end disposed toward the second end of the edge of the flange, the flashing element further comprising a second edge structure disposed toward the second end of the edge of the flange with respect to the first edge structure, the second edge structure being selected from an edgewall without a return feature, an edgewall with a return feature and a return hem, the second edge structure having a first end disposed toward a first end of the edge of the flange and a second end disposed toward the second end of the edge of the flange, wherein the total thickness of the second edge structure at its second end is no greater than the interior thickness of the first edge structure at its first end.

The person of ordinary skill in the art will appreciate that the various identities, thicknesses and widths of the first and second edge structures can be as described herein with respect to various particular embodiments.

In all aspects of the invention, as the person of ordinary skill in the art will appreciate, the transition between the shape of the return hem, edgewall and/or return feature can change along the edge of the flashing element. The change can be gradual or continuous, or can be discontinuous (e.g., a substantially sharp "jump" from one thickness or width to another). Similarly, in embodiments in which the first edge structure is of a different type than the second edge structure, the change between them can be gradual or continuous, or can be discontinuous (e.g., a substantially sharp "jump" from one type to another).

In certain embodiments, the flange has a width of at least about 50 mm, at least about 70 mm, or even at least about 95 mm. In certain embodiments, the flange has a width of no more than about 500 mm, or even no more than about 300 mm.

The flashing elements described herein can be made of any desirable material. For example, they can be molded or formed from plastic or metal, for example, using materials conventional in roofing applications. Return hems, edgewalls and return features can be molded as part of the initial fabrication, or formed by bending an edge of the flashing after the part is formed.

Figure 24:
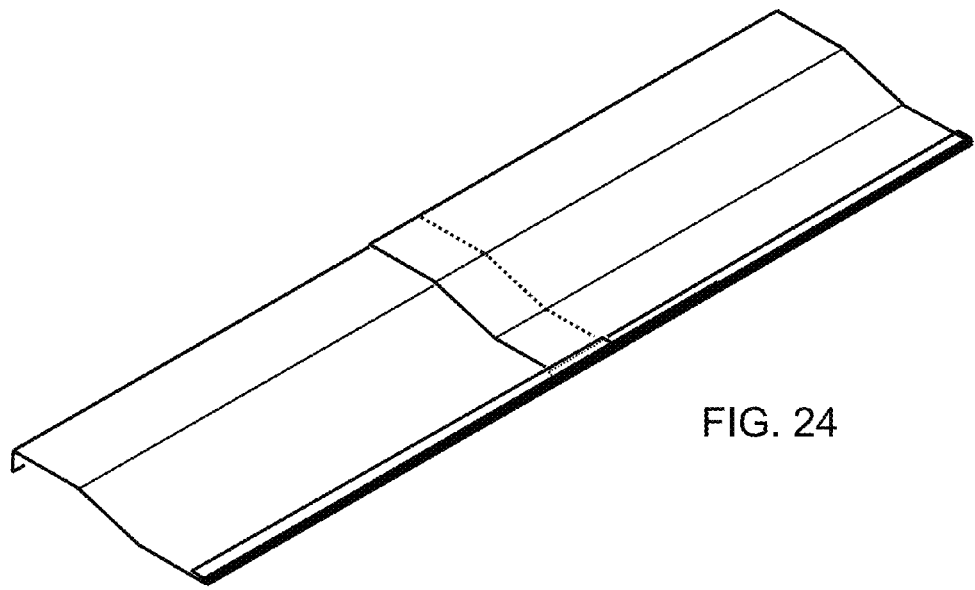
FIG. 24 is a perspective schematic view of two top flashing elements arranged in a nested fashion.

Another aspect of the invention is a roofing system including two flashing elements as described herein, arranged on a roof in an overlapping manner, such that the return hem of an overlying flashing element nests within the return hem of an underlying side flashing element. For example, in one embodiment, a roofing system includes two side flashing elements as described herein, arranged up the roof in an overlapping manner, such that the return hem, edgewall or return feature at the down-roof end of an overlying side flashing element nests within the return hem, edgewall or return feature at the up-roof end of an underlying side flashing element. Such an embodiment is shown in perspective schematic view in FIG. 8. For example, in certain embodiments, the side flashing elements nest together over an extending overlapping length. For example, the extending overlapping length can be at least about 5 mm, at least about 10 mm, at least about 20 mm, at least about 35 mm, at least about 50 mm, or even at least about 100 mm. In other embodiments, a roofing system includes two flashing elements (e.g., top flashing elements) as described herein, arranged along the roof (e.g., substantially horizontally) in an overlapping manner, such that the return hem, edgewall or return feature at the second end of an overlying flashing element nests within the return hem, edgewall or return feature at the first end of an underlying flashing element. Such an embodiment is shown in perspective schematic view in FIG. 24. For example, in certain embodiments, the flashing elements nest together over an extending overlapping length. For example, the extending overlapping length can be at least about 5 mm, at least about 10 mm, at least about 20 mm, at least about 35 mm, at least about 50 mm, or even at least about 100 mm.

In certain embodiments, the roofing system includes a plurality of such flashing elements (e.g., 3 or more), linearly arranged in an overlapping manner, such that the return hem, edgewall or return feature at the down-roof end of an overlying side flashing element nests within the return hem, edgewall or return feature at the up-roof end of an underlying side flashing element, or the return hem, edgewall or return feature at the second end of an overlying flashing element nests within the return hem, edgewall or return feature at the first end of an underlying flashing element.

In certain embodiments, one or more roofing elements, such as shingles (e.g., asphalt shingles), tiles, panels or shakes are disposed (e.g., in an overlapping manner as is common for roofing elements) on the flanges of the linearly-arranged flashing elements. For example, the roofing elements can substantially cover the flanges (e.g., leaving less than about 15 mm, less than about 10 mm, or even less than about 5 mm of the width of the flanges exposed).

Another aspect of the invention is a photovoltaic roofing system disposed on a roof deck having an up-roof end (i.e., toward the ridge of the roof) and a down-roof end (i.e., toward the eave of the roof). The photovoltaic roofing system includes one or more photovoltaic roofing elements contiguously disposed on the roof deck, the contiguously-disposed roofing elements together having an up-roof edge facing the up-roof end of the roof deck, a down-roof edge facing the down-roof end of the roof deck, and two side edges. The photovoltaic roofing system also includes a plurality of roofing elements disposed adjacent the contiguously-disposed photovoltaic roofing elements, along their side edges. The photovoltaic roofing system further comprises side flashing elements, as described herein, along the side edges of the contiguously-disposed photovoltaic roofing elements, with their flanges being at least partially disposed between a roofing element and the roof deck. The vertically-extending features interact with a lateral edge of the contiguously-disposed array of photovoltaic roofing elements to provide a water-resistant interface therebetween.

Figure 25:
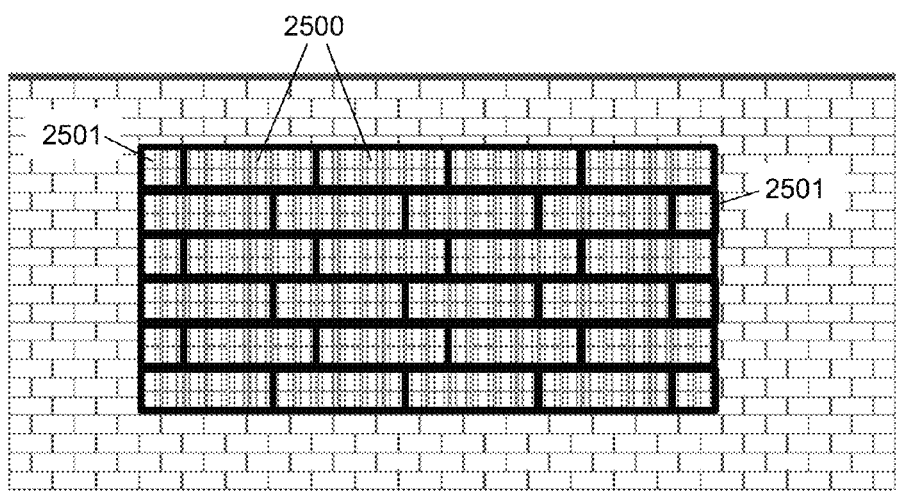
FIG. 25 is a schematic top view of a photovoltaic roofing system according to one embodiment of the invention.

For example, FIG. 25 is a schematic top view of a photovoltaic roofing system, in which a rectangular array of contiguously-disposed photovoltaic roofing elements as described above is installed on a roof with conventional metric three-tab shingle of 13¼"×39⅜" dimension and 5⅝" exposure. Each photovoltaic roofing element 2700 includes 2 rows of 6 six-inch square photovoltaic elements. The photovoltaic roofing elements are offset by using shorter photovoltaic roofing elements 2701 at alternate ends of the courses, each shorter photovoltaic roofing element having 2 rows of 2 photovoltaic elements. In some embodiments an offset is preferred so that continuous alignment of a large number of drainage channels in the shiplap portion of the photovoltaic roofing elements does not occur vertically up the array. Left side edge flashing (as described herein, not shown) is provided along the left edge of each course of photovoltaic roofing elements in the array. Right side edge flashing (as described herein, not shown) is provided at the right edge of each course of photovoltaic roofing elements. The flanges of the side flashings are covered by overlying shingles. Top flashing (as described herein, not shown) with molded edge flashing for the ends of the array is included across the top of the array and covered by overlying shingles.

For example, in certain embodiments, each photovoltaic roofing element comprises one or more photovoltaic elements disposed on a frame structure. The frame structure includes sidelap portions having geometries adapted to interlock with adjacent photovoltaic roofing elements to provide water drainage channels. The vertically-extending feature includes a matched interlocking geometry adapted to interlock with the sidelap portion of an adjacent photovoltaic roofing element. For example, in certain embodiments, the vertically-extending features of the side flashing elements along a first lateral edge of the contiguously-disposed photovoltaic roofing elements include a downward-facing flange, disposed in upward-facing channels of the photovoltaic roofing elements disposed along the first lateral edge; and wherein the vertically-extending features of the side flashing elements along a second lateral edge of the contiguously-disposed photovoltaic roofing elements include an upward-facing water drainage channel, into which downward-facing flanges of the photovoltaic roofing elements disposed along the second lateral edge are disposed. Such photovoltaic roofing elements are described in detail in U.S. Patent Application Publications nos. 2012/0210660 and 2012/0186630 and U.S. patent application Ser. No. 13/675,585, each of which is hereby incorporated herein by reference its entirety. The person of ordinary skill the art will appreciate that the various aspects of the vertically-extending features of the flashing elements, the photovoltaic roofing elements, and the overall system architecture can be as described therein. Such modifications are considered to be within the scope of this disclosure.

Preferably a top flashing (e.g., as described herein) is also included to merge the photovoltaic roofing system with a field of conventional roofing products and close the transition areas therebetween to the elements. Accordingly, in certain embodiments, one or more top flashing elements are disposed along the up-roof edge of the contiguously-disposed photovoltaic roofing elements, the one or more top flashing elements having a vertically-extending feature disposed over the up-roof edge of the contiguously-disposed photovoltaic roofing elements, and a flange disposed under one or more roofing elements disposed along the up-roof edge of the contiguously-disposed photovoltaic roofing elements.

Figure 26:
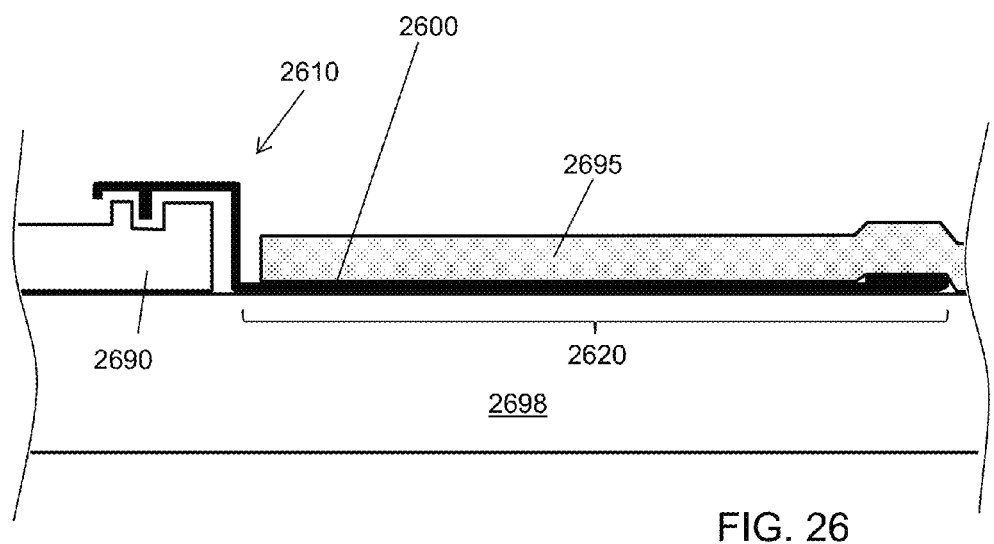
FIG. 26 is a schematic cross-sectional view of a flashing element as installed on a roof.

Thus, certain aspects of the invention relate to the fashion in which flashing elements are provided to close the transition that merges a photovoltaic array made up of photovoltaic roofing elements into the field of conventional roofing products used in conjunction with the photovoltaic roofing elements. A flashing element as installed on a roof is shown in cross-sectional schematic view in FIG. 26. In this embodiment, side flashing element 2600 is disposed on roof deck 2698, with its vertically-extending feature 2610 interlocking with a photovoltaic roofing element 2690. A conventional roofing element 2695 (here, an asphalt shingle) is disposed such that it substantially covers the flange 2620. As the person of ordinary skill in the art will appreciate, overlapping roofing elements can extend along a plurality of linearly-arranged flashing elements.

Figure 27:
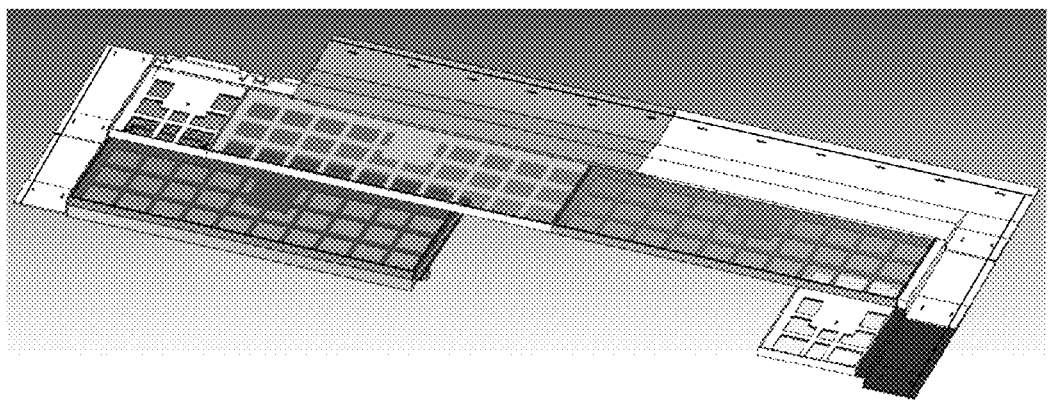
FIG. 27 is a perspective schematic view of flashing elements as installed together with a small array of photovoltaic roofing elements.

Flashing elements as installed together with a small array of photovoltaic roofing elements (frame structures shown) are shown in perspective schematic view in FIG. 27. The photovoltaic roofing elements are similar to those described in U.S. Patent Application Publications nos. 2012/0210660 and 2012/0186630 and U.S. patent application Ser. No. 13/675,585, each of which is hereby incorporated herein by reference in its entirety, with the photovoltaic elements being shown as semitransparent. In the frame structures, the exposure area is underlied by slats (here, criss-crossing), spaced to support the photovoltaic elements, but allowing wiring to run from the downward-facing side of the photovoltaic elements to the downward-facing surface of the photovoltaic roofing element, thereby protecting it from weather. In this embodiment, the slat structure also includes a square pad for the attachment of larger electrical components, for example, a junction box for wiring together individual photovoltaic elements and providing a single electrical output for the overall photovoltaic roofing element. In the array of photovoltaic roofing elements of FIG. 27, the individual photovoltaic roofing elements are laterally offset from one another; this offset configuration provides a visual effect similar to some conventional roofing materials. Shorter framing structures are included to fill in the offset so that the array has common linear left and right edges. These fill pieces may include photovoltaic elements (not shown), or may include another upper surfacing media (not shown) with a complementary visual appearance to the photovoltaic roofing elements and/or associated conventional roofing elements to be installed therearound. Left side flashing elements are included in the assembly of FIG. 27, applied in an overlapping fashion and cooperatively engaged with the left edge of the photovoltaic roofing elements as described above. A cant strip (as described in U.S. Patent Application Publications nos. 2012/0210660 and 2012/0186630 and U.S. patent application Ser. No. 13/675,585, each of which is hereby incorporated herein by reference its entirety) is provided to raise the lower leading edge of the bottommost course of photovoltaic roofing elements. Right side flashing elements are included to cooperatively engage the right side edges of the photovoltaic roofing elements as described above. It will be noted that fastening locations for the side flashing elements are such that a lower fastening location of each unit is suggested and that an upper fastening point is accomplished by successive fastening of the next overlying course flashing element. Top flashing elements are also included in the assembly of FIG. 27. The top right end flashing element includes the flange to the right to underlie adjacent conventional roofing elements, and includes raised bend portions (i.e., as vertically-extending features) to step up and onto the contiguously-disposed photovoltaic roofing elements at the edge thereof. In this instance, the right top end flashing element overlaps the center top flashing element with a hidden alignment overlap. In this instance, the top flashing elements are depicted with fastening slots. With slots it may be desirable to fasten the pieces to the roof in a non-hardnailing manner so that larger pieces may move laterally to accommodate thermal expansion and contraction. It will be understood that in certain instances, an alignment undercut or thinning may be omitted, in which case it may be desirable for the flashing elements to float freely analogously to conventional vinyl siding to accommodate thermal expansion and contraction in use. It will be also understood that in a wider array including a greater number of photovoltaic roofing elements, a larger number of top center flashing elements may be employed. For purposes of clarity, a left top end flashing element is not shown in FIG. 27, but the person of skill in the art would understand that a full assembly can include one.

In preferred photovoltaic roofing systems the parts are available in modular components that fit together and can be kitted in advance to minimize the need for fabrication on site.

For example, flashing components and cant strips, in this instance, are provided in lengths that are integral multiples of the dimensions of the photovoltaic roofing elements or partial photovoltaic roofing element sizes to accommodate predetermined arrays for the roofing system in dimensions and power ratings suitable for a particular roofing project. Accordingly, assembly on the roof can be simplified.

Any cabling or wiring interconnecting the photovoltaic roofing elements of the invention in a photovoltaic roofing system can, for example, be long and flexible enough to account for natural movement of a roof deck, for example due to heat, moisture and/or natural expansion/contraction. The cabling or wiring can be provided as part of a photovoltaic roofing element, or alternatively as separate components that are interconnected with the photovoltaic roofing elements (e.g., through electrical connectors) during installation.

Examples of electrical connectors that can be suitable for use or adapted for use in practicing various embodiments of the invention are available from Kyocera, Tyco Electronics, Berwyn, Pa. (trade name Solarlok) and Multi-Contact USA of Santa Rosa, Calif. (trade name Solarline). U.S. Pat. Nos. 7,445,508 and 7,387,537, U.S. Patent Application Publications nos. 2008/0271774, 2009/0126782, 2009/0133740, 2009/0194143 and 2010/0146878, each of which is hereby incorporated herein by reference in its entirety, disclose electrical connectors for use with photovoltaic roofing products. Of course, other suitable electrical connectors can be used. Electrical connectors desirably meet UNDERWRITERS LABORATORIES and NATIONAL ELECTRICAL CODE standards.

In certain embodiments, the photovoltaic roofing elements of the array are electrically interconnected. The interconnected photovoltaic array can be interconnected with one or more inverters to allow photovoltaically-generated electrical power to be used on-site, stored in a battery, or introduced to an electrical grid. For example, a single inverter can be used to collect the photovoltaically-generated power and prepare it for further use. In other embodiments, the photovoltaic roofing elements can be interconnected with a plurality of micro-inverters disposed on the roof. For example, a single micro-inverter can be used for each photovoltaic roofing element; or a single micro-inverter can be used for a group of photovoltaic roofing elements.

Another aspect of the invention is a roof comprising a roof deck and a roofing system or a photovoltaic roofing system as described herein disposed on the roof deck. The photovoltaic roofing systems described herein can be utilized with many different building structures, including residential, commercial and industrial building structures, and with many different roof-mounted structures.

There can be one or more layers of material (e.g. underlayment), between the roof deck and the photovoltaic roofing elements and flashing elements described herein. The roof can also include one or more standard roofing elements, for example to provide weather protection at the edges of the roof, or in areas not suitable for photovoltaic power generation. In some embodiments, non-photovoltaically-active roofing elements are complementary in appearance or visual aesthetic to the photovoltaic roofing elements. Standard roofing elements can be interleaved at the edges of the photovoltaic arrays described herein. In certain embodiments, the photovoltaic roofing elements are simply disposed on top of an already-installed array of standard roofing elements (e.g., an already-shingled roof).

Another aspect of the invention is a kit for the installation of a roofing system, the kit comprising a plurality of flashing elements as described herein (i.e., in unassembled form). In certain embodiments, the flashing elements are side flashing elements. The kit can further include a plurality of photovoltaic roofing elements as described herein, with the plurality of side flashing elements being adapted to interlock (e.g., through their vertically-extending features) with the photovoltaic roofing elements of the kit. The kit can further include a plurality of top flashing elements as described herein. The kit can also include a plurality of cant strip elements as described herein.

Further, the foregoing description of embodiments of the present invention has been presented for the purposes of illustration and description. It is not intended to be exhaustive or to limit the invention to the precise forms disclosed. As the person of skill in the art will recognize, many modifications and variations are possible in light of the above teaching. It will be apparent to those skilled in the art that various modifications and variations can be made to the present invention without departing from the scope of the invention. Thus, it is intended that the present invention cover the modifications and variations of this invention provided they come within the scope of the claims and their equivalents.

What is claimed is:

1. A roofing system comprising
    an underlying flashing element having a cross-sectional shape comprising a laterally-extending flange, the flange having an edge, a first end and a second end, the underlying flashing element comprising a return hem disposed at the edge and comprising a folded-over strip of material disposed over the top surface of the flange at the edge, the return hem having a first end disposed toward the first end of the edge, and a second end disposed toward the second end of the edge, wherein the total thickness of the return hem at its second end is no greater than the interior thickness of the return hem at its first end; and
    an overlying flashing element having a cross-sectional shape comprising a laterally-extending flange, the flange having an edge, a first end and a second end, the overlying flashing element comprising a return hem disposed at the edge and comprising a folded-over strip of material disposed over the top surface of the flange at the edge, the return hem having a first end disposed toward the first end of the edge, and a second end disposed toward the second end of the edge, wherein the total thickness of the return hem at its second end is no greater than the interior thickness of the return hem at its first end;
    wherein
    the second end of the flange of the overlying flashing element overlaps the first end of the flange of the underlying flashing element,
    the second end of the return hem of the overlying flashing element nests under the folded-over strip of material of the return hem of the underlying flashing element at the first end thereof, and
    the return hem of the underlying flashing element includes a discontinuity, at which the inside thickness of the return hem transitions, in a direction going from the first end of the return hem, from substantially greater than the total thickness of the return hem at its second end to substantially less than the total thickness of the return hem at its second end.

2. The roofing system according to claim 1, wherein each of the overlying flashing element and the underlying flashing element further comprises a vertically-extending feature.

3. The roofing system according to claim 2, wherein in each of the overlying flashing element and the underlying flashing element, the flange extends away from a lateral side of the vertically-extending feature at the downward end thereof, the edge bearing the return hem being distal to the vertically-extending feature.

4. The roofing system according to claim 1, wherein each of the underlying flashing element and the overlying flashing element is configured as a side flashing element disposed on a roof with its first end as an up-roof end and its second end as a down-roof end.

5. The roofing system according to claim 1, each of the underlying flashing element and the overlying flashing element is configured as a top flashing element disposed substantially horizontally along a roof deck.

6. A photovoltaic roofing system disposed on a roof deck having an up-roof end and a down-roof end, the photovoltaic roofing system comprising
one or more photovoltaic roofing elements contiguously disposed on the roof deck, the contiguously-disposed photovoltaic roofing elements together having an up-roof edge facing the up-roof end of the roof deck, a down-roof edge facing the down-roof end of the roof deck, and two side edges;
a plurality of roofing elements disposed adjacent the contiguously-disposed photovoltaic roofing elements, along their side edges;
a roofing system according to claim 2, disposed along the side edges of the contiguously-disposed photovoltaic roofing elements, with the flanges of the underlying flashing element and the overlying flashing element being at least partially disposed between a roofing element and the roof deck, and their vertically-extending features interacting with a lateral edge of the contiguously-disposed array of photovoltaic roofing elements to provide a water-resistant interface therebetween.

7. A roofing system comprising
an underlying flashing element having a cross-sectional shape comprising a laterally- extending flange, the flange having an edge, a first end and a second end, the flashing element comprising a first edge structure disposed toward the first end of the edge, the first edge structure being selected from a return hem comprising a folded-over strip of material disposed over the top surface of the flange at the edge, and an edgewall with a return feature, the first edge structure having a first end disposed toward a first end of the edge and a second end disposed toward the second end of the edge, the underlying flashing element further comprising a second edge structure disposed toward the second end of the edge with respect to the first edge structure, the second edge structure being selected from an edgewall with a return feature and a return hem, the second edge structure having a first end disposed toward a first end of the edge and a second end disposed toward the second end of the edge, wherein the total thickness of the second edge structure at its second end is no greater than the interior thickness of the first edge structure at its first end; and
an overlying flashing element having a cross-sectional shape comprising a laterally-extending flange, the flange having an edge, a first end and a second end, the flashing element comprising a first edge structure disposed toward the first end of the edge, the first edge structure being selected from a return hem and an edgewall with a return feature, the first edge structure having a first end disposed toward a first end of the edge and a second end disposed toward the second end of the edge, the overlying flashing element further comprising a second edge structure disposed toward the second end of the edge with respect to the first edge structure, the second edge structure being selected from an edgewall with a return feature and a return hem, the second edge structure having a first end disposed toward a first end of the edge and a second end disposed toward the second end of the edge, wherein the total thickness of the second edge structure at its second end is no greater than the interior thickness of the first edge structure at its first end,
wherein the second end of the flange of the overlying flashing element overlaps the first end of the flange of the underlying flashing element, the second edge structure of the overlying flashing element nests under the folded-over strip of material of the return hem or the return feature of the first edge structure of the underlying flashing element, and the first edge structure of the flange of the underlying flashing element includes a discontinuity, at which the inside thickness of the first edge structure flange of the underlying flashing element transitions, in a direction going from the first end of the first edge structure flange, from substantially greater than the total thickness of the second edge structure to substantially less than the total thickness of the second edge structure.

8. The roofing system according to claim 7, wherein the first edge structure is a return hem and the second edge structure is a return hem.

9. The roofing system according to claim 7, wherein the first edge structure is an edgewall with a return feature.

10. The roofing system according to claim 7, wherein the second edge structure is a return hem.

11. The roofing system according to claim 7, further comprising one or more mounting holes formed in the flange.

12. The roofing system according to claim 7, wherein the first edge structure and/or the second edge structure include an edgewall is formed with an angle of no greater than about 105° with respect to the flange.

13. A roofing system comprising
an underlying flashing element having a cross-sectional shape comprising a vertically-extending feature, a flange extending laterally from the vertically-extending feature at the downward end thereof, the flange having an edge, a first end and a second end, the flashing element comprising a first edge structure disposed toward the first end of the edge, the first edge structure being selected from a return hem, and an edgewall without a return feature, and an edgewall with a return feature, the first edge structure having a first end disposed toward a first end of the edge and a second end disposed toward the second end of the edge, the flashing element further comprising a second edge structure disposed toward the second end of the edge with respect to the first edge structure, the second edge structure being selected from an edgewall without a return feature, an edgewall with a return feature and a return hem, the second edge structure having a first end disposed toward a first end of the edge and a second end disposed toward the second end of the edge, wherein the total width of the flange at the second end of the second edge structure is no greater than the interior width of the flange at the first end of the first edge structure; and
an overlying flashing element having a cross-sectional shape comprising a vertically-extending feature, a flange extending laterally from the vertically-extending feature at the downward end thereof, the flange having an edge, a first end and a second end, the flashing element comprising a first edge structure disposed toward the first end of the edge, the first edge structure being selected from a return hem, and an edgewall without a return feature, and an edgewall with a return feature, the first edge structure having a first end disposed toward a first end of the edge and a second end disposed toward the second end of the edge, the flashing element further comprising a second edge structure disposed toward the second end of the edge with respect to the first edge structure, the second edge structure being selected from an edgewall without a return feature, an edgewall with a return feature and a return hem, the second edge structure having a first end disposed toward a first end of the edge and a second end disposed toward the second end of the edge, wherein the total width of the flange at the second end of the second edge structure is no greater than the interior width of the flange at the first end of the first edge structure;

wherein the second end of the flange of the overlying flashing element overlaps the first end of the flange of the underlying flashing element, the second edge structure of the overlying flashing element nests within the first edge structure of the underlying flashing element, and the first edge structure of the underlying flashing element includes a discontinuity, at which the interior width of the flange at the first end of the underlying flashing element transitions, in a direction going from the first end of the flange, from substantially greater than the total width of the flange at the second end of the overlying flashing element to substantially less than the total width of the flange at the second end of the overlying flashing element.

14. The roofing system according to claim 13, wherein the first edge structure is a return hem and the second edge structure is a return hem.

15. The roofing system according to claim 13, wherein the first edge structure is an edgewall with a return feature.

16. The roofing system according to claim 13, wherein each of the underlying flashing element and the overlying flashing element is configured as a side flashing element disposed on a roof deck with its first end as an up-roof end and its second end as a down-roof end.

17. The roofing system according to claim 13, wherein each of the underlying flashing element and the overlying flashing element is configured as a top flashing element disposed substantially horizontally along a roof deck.

18. A photovoltaic roofing system disposed on a roof deck having an up-roof end and a down-roof end, the photovoltaic roofing system comprising one or more photovoltaic roofing elements contiguously disposed on the roof deck, the contiguously-disposed roofing elements together having an up-roof edge facing the up-roof end of the roof deck, a down-roof edge facing the down-roof end of the roof deck, and two side edges;

a plurality of roofing elements disposed adjacent the contiguously-disposed photovoltaic roofing elements, along their side edges;

a roofing system according to claim 13, disposed along the side edges of the contiguously-disposed photovoltaic roofing elements, a with the flanges of the underlying flashing element and the overlying flashing element being at least partially disposed between a roofing element and the roof deck, and with vertically-extending features interacting with a lateral edge of the contiguously-disposed array of photovoltaic roofing elements to provide a water-resistant interface therebetween.

19. The roofing system according to claim 1, wherein the second end of the return hem of the overlying flashing element is disposed substantially against the discontinuity.

20. The roofing system according to claim 1, wherein the each of the flanges of the underlying flashing element and the overlying flashing element is at least partially disposed between a roofing element and a roof deck.

21. The roofing system according to claim 7, wherein the second edge structure of the overlying flashing element is disposed substantially against the discontinuity.

22. The roofing system according to claim 7, wherein the transition is made over a distance along the first edge structure of the underlying flashing element of less than 2 mm.

23. The roofing system according to claim 13, wherein the second edge structure of the overlying flashing element is disposed substantially against the discontinuity.

24. The roofing system according to claim 13, wherein the each of the flanges of the underlying flashing element and the overlying flashing element is at least partially disposed between a roofing element and a roof deck.

\* \* \* \* \*